Patented Nov. 4, 1930

1,780,252

UNITED STATES PATENT OFFICE

ALFRED THAUSS, OF COLOGNE-DEUTZ, AND GUSTAV MAUTHE, OF COLOGNE-HOLWEIDE, GERMANY, ASSIGNORS TO GENERAL ANILINE WORKS, INC., OF NEW YORK, N. Y., A CORPORATION OF DELAWARE

WATER-SOLUBLE PRODUCT DERIVED FROM THE FATTY ACIDS OCCURRING IN WOOL FAT AND PROCESS OF PREPARING THE SAME

No Drawing. Application filed December 16, 1927, Serial No. 240,625, and in Germany December 17, 1926.

The present invention relates to new water-soluble products derived from the fatty acids occurring in wool fat and a process of preparing the same.

We have found that by treating the fatty acids occurring in wool fat with a sulfonating agent such as sulfuric acid monohydrate, chlorosulfonic acid, and the like, in the presence of a phenol, new products are obtainable which are at ordinary temperature semi-solid masses and which are distinguished principally by the fact that they are not only soluble in alkaline or neutral reacting solvents but likewise in dilute mineral acids; the new products as well as the salts thereof are intended to be used in dyeing and the manufacture of leather.

The following example will illustrate our invention:—

*Example.*—9 parts by weight of commercial fatty acid obtainable from wool fat and 3 parts by weight of phenol are melted together by heating and then cooled to about 20 to 30° C., whereupon sulfonation is effected by the gradual addition of 16 parts by weight of sulfuric acid monohydrate. The whole is allowed to stand for about 12 to 24 hours and then poured with efficient stirring upon 9 parts by weight of ice. The excess of aqueous acid can be easily separated at low temperature from the greasy, crude product by pressing and decantation. The residual mass is then repeatedly kneaded with a common salt solution and thus freed from the bulk of the still remaining sulfuric acid. In order to remove the last traces of sulfuric acid and thus to produce a product which is quite free from acid, the crude product, obtainable as hereinbefore described, is redissolved once or several times in about 6 times its weight of hot water and salted out by means of common salt, thus forming an oily layer above the brine-solution.

The product is at ordinary temperature a greasy, semi-solid mass and becomes an oil already at a slightly raised temperature; it is easily soluble in water and the solution is acid to litmus; it is not precipitated by the addition of mineral acids in dilute solution, even on heating; from its aqueous alkaline or acid solutions it may easily be salted out.

We claim:

1. The process for the manufacture of a water soluble product from the fatty acids occurring in wool fat which process comprises treating these fatty acids with sulfuric acid monohydrate in the presence of a phenol.

2. The new products obtainable by treating the fatty acids occurring in wool fat with a sulfonating agent in the presence of a phenol being at ordinary temperature semi-solid masses, soluble in dilute mineral acid and in alkaline and neutral reacting solvents.

3. The new product obtainable by treating commercial fatty acid derived from wool fat with sulfuric acid monohydrate in the presence of phenol being at ordinary temperature a greasy, semi-solid mass, which becomes an oil at a slightly raised temperature, being easily soluble in water forming thereby a solution reacting acid to litmus not being precipitated from its dilute solution by the addition of a mineral acid, even on heating, but being easily salted out from its aqueous alkaline or acid solution by the addition of a neutral salt.

4. The process for the manufacture of a water-soluble product from the fatty acids occurring in wool fat which process comprises treating said fatty acids with a sulfonating agent in the presence of a phenol.

5. The process for the manufacture of a water-soluble product from commercial fatty acids derived from wool fat which process comprises treating these fatty acids with a sulfonating agent in the presence of a phenol.

6. The process for the manufacture of a water-soluble product from commercial fatty acids derived from wool fat which process comprises treating these fatty acids with sulfuric acid monohydrate in the presence of a phenol.

In testimony whereof we have hereunto set our hands.

ALFRED THAUSS.
GUSTAV MAUTHE.